(12) United States Patent
Holmquist et al.

(10) Patent No.: US 7,712,396 B2
(45) Date of Patent: May 11, 2010

(54) LAMINATED STAMPING TOOL

(75) Inventors: Marlon E. Holmquist, Gibbon, MN (US); Jeffrey M. Kes, Jordan, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 785 days.

(21) Appl. No.: 11/583,965

(22) Filed: Oct. 18, 2006

(65) Prior Publication Data

US 2008/0092622 A1    Apr. 24, 2008

(51) Int. Cl.
*B21K 5/20* (2006.01)
*B23K 26/00* (2006.01)

(52) U.S. Cl. .................. 76/107.1; 72/455; 72/478; 219/121.67; 249/79

(58) Field of Classification Search ............ 249/79, 249/160; 219/121.67; 76/101.1, 107.1; 72/455, 72/478
See application file for complete search history.

(56) References Cited

U.S. PATENT DOCUMENTS

| | | | |
|---|---|---|---|
| 2,679,172 A * | 5/1954 | Clevenger et al. .......... 76/107.1 |
| 3,375,568 A * | 4/1968 | Kelsey ................. 76/101.1 |
| 4,264,663 A | 4/1981 | Beenken | |
| 4,497,196 A | 2/1985 | Bakermans et al. | |
| 4,821,615 A | 4/1989 | Bakermans et al. | |
| 4,884,484 A | 12/1989 | Bakermans et al. | |
| 5,031,483 A * | 7/1991 | Weaver ................. 76/107.1 |
| 5,247,861 A * | 9/1993 | Jahn ..................... 76/107.1 |
| 5,793,015 A * | 8/1998 | Walczyk .............. 219/121.67 |
| 5,983,757 A | 11/1999 | Blise et al. | |
| 6,345,526 B1 | 2/2002 | Dériaz et al. | |
| 7,097,729 B2 * | 8/2006 | Barlier ................. 156/256 |
| 7,222,834 B2 * | 5/2007 | Manuel et al. ............. 249/79 |

* cited by examiner

*Primary Examiner*—David B Jones
(74) *Attorney, Agent, or Firm*—Merchant & Gould P.C.

(57) ABSTRACT

A stamping tool and a method of making a punch assembly and a die assembly of the stamping tool. At least one of the punch and die assemblies including a plurality of laser-cut steel plates having hardened edges suitable to withstand high pressures and impacts generated during stamping operations. The assembly further including an internal passage defined by holes formed in a number of plates of the plurality of laser-cut steel plates.

19 Claims, 11 Drawing Sheets

LAMINATED STAMPING TOOL

FIELD OF THE INVENTION

This disclosure relates to methods and devices for use in the manufacturing industry. More specifically, this disclosure relates to methods and devices for use with stamping machines.

BACKGROUND OF THE INVENTION

The principle operation of stamping machines involves the use of a die and a punch for the making of generally flat components or parts. One or both of the punch and die move towards one another to cut or stamp out the component from a strip of material placed between the punch and die. The material can include sheet metal, plastic, or other materials used in the manufacture of stamped components. In some applications, a feeding mechanism incrementally feeds the strip of material through the machine for mass manufacture of the stamped component.

In use, the punch and die operate under significant pressure and force to stamp out the components. To withstand such operational forces, the punch and die are typically made from solid metal blocks. Manufacture of such tooling, i.e., the punch and die, requires milling, drilling and turning of the solid blocks, and can further include electrical discharge machining, heat treating, and surface grindings. As can be understood, the manufacture of the punch and die tooling can be very expensive. Maintenance or replacement of the expensive tooling accordingly involves considerable costs.

In general, conventional punch and die tooling for use in stamping machines can be improved.

SUMMARY OF THE INVENTION

One aspect of the present invention relates to a stamping punch and a stamping die, and a method of making the punch and die. The punch and die can each include a plurality of laser cut steel sections or plates, some of which have hardened edges suitable to withstand high pressures and impacts generated during stamping operations. Another aspect of the present invention relates to internal passages formed within the punch and die by particular arrangement of the sections or plates.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The features of the present disclosure relate to a stamping tool that can be manufactured in a relatively short period of time and at a fraction of the cost of conventional stamping tools. Conventional stamping tools are made by turning, milling, and drilling and/or electrical discharge machining (EDM) operations. To obtain a stamping tool having suitable structure with hardened edges that can withstand the high pressure and impact generated during use of the tool, manufacture sometimes further requires heat treat and subsequent surface grinding. As can be understood, the manufacture of such conventional stamping tools can be expensive and time consuming.

The present disclosure describes stamping tools, and methods that significantly simplifies the manufacture of stamping tools. The method includes laser cutting a number of wafers or plates that make up the stamping tool. As will be described in greater detail hereinafter, laser cutting the components of the stamping tool reduces/eliminates expensive and time-consuming machining processes as well as heat treating and subsequent surface grinding procedures. Due to the reduction/elimination of these processes, the presently disclosed stamping tool can be made at low cost and in a significantly reduced period of time.

Figure 1:
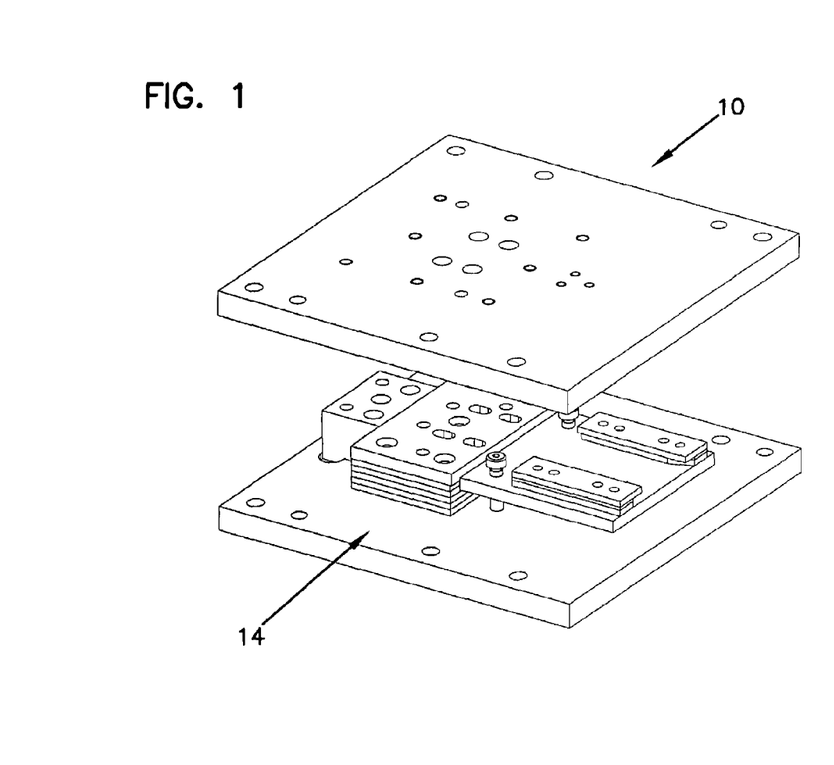
FIG. 1 is top perspective view of one embodiment of a stamping tool, including a punch assembly and a die assembly, in accordance with the principles disclosed.
Figure 2:
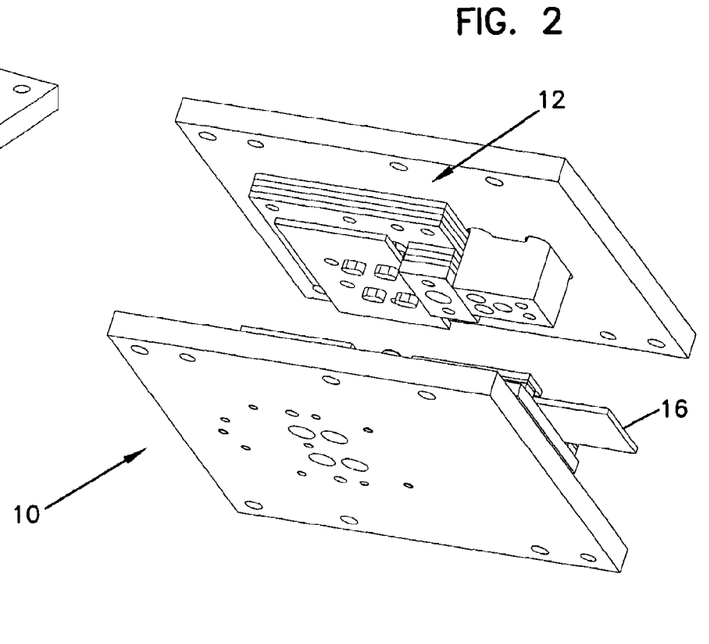
FIG. 2 is a bottom perspective view of the stamping tool of FIG. 1.
Figure 5:
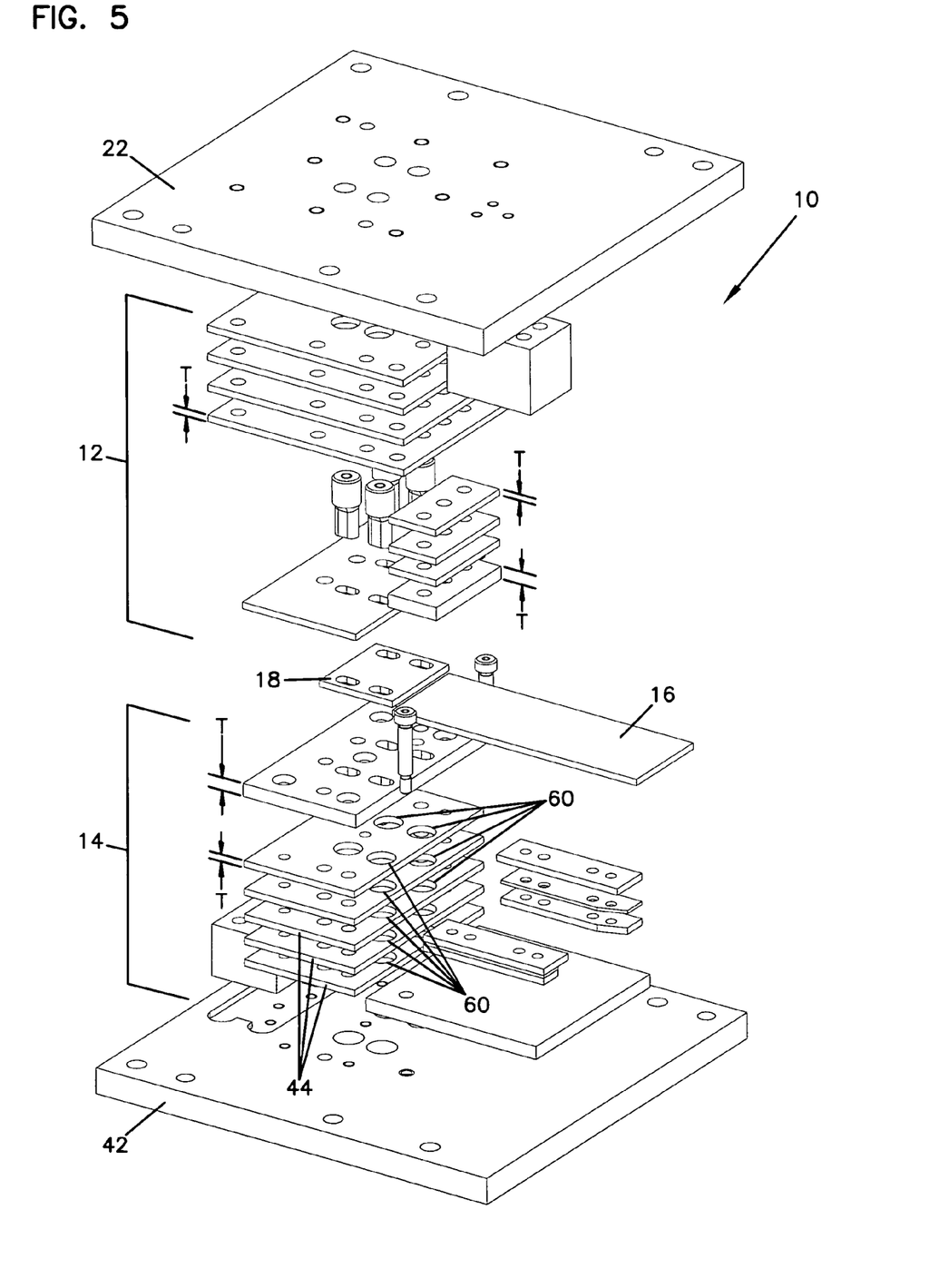
FIG. 5 is an exploded perspective view of the stamping tool of FIG. 1.

Referring to FIGS. 1 and 2, a first embodiment of a stamping tool 10, made in accordance with the principle disclosed, is illustrated. The stamping tool 10 generally includes a first laminated punch assembly 12 and a second laminated die assembly 14. In operation, a strip of material 16 (FIG. 2; see also FIG. 5) is positioned between the assemblies 12, 14. With great force, the punch assembly 12 and/or the die assembly 14 move toward one another, cutting or punching through the strip of material 16 to form a stamped part 18 (FIG. 5). The punch assembly 12 and/or the die assembly 14 then retract so that the strip of material 16 can be moved or progressed forward, and the cycle repeated for mass manufacture of the stamped part.

Figure 3:
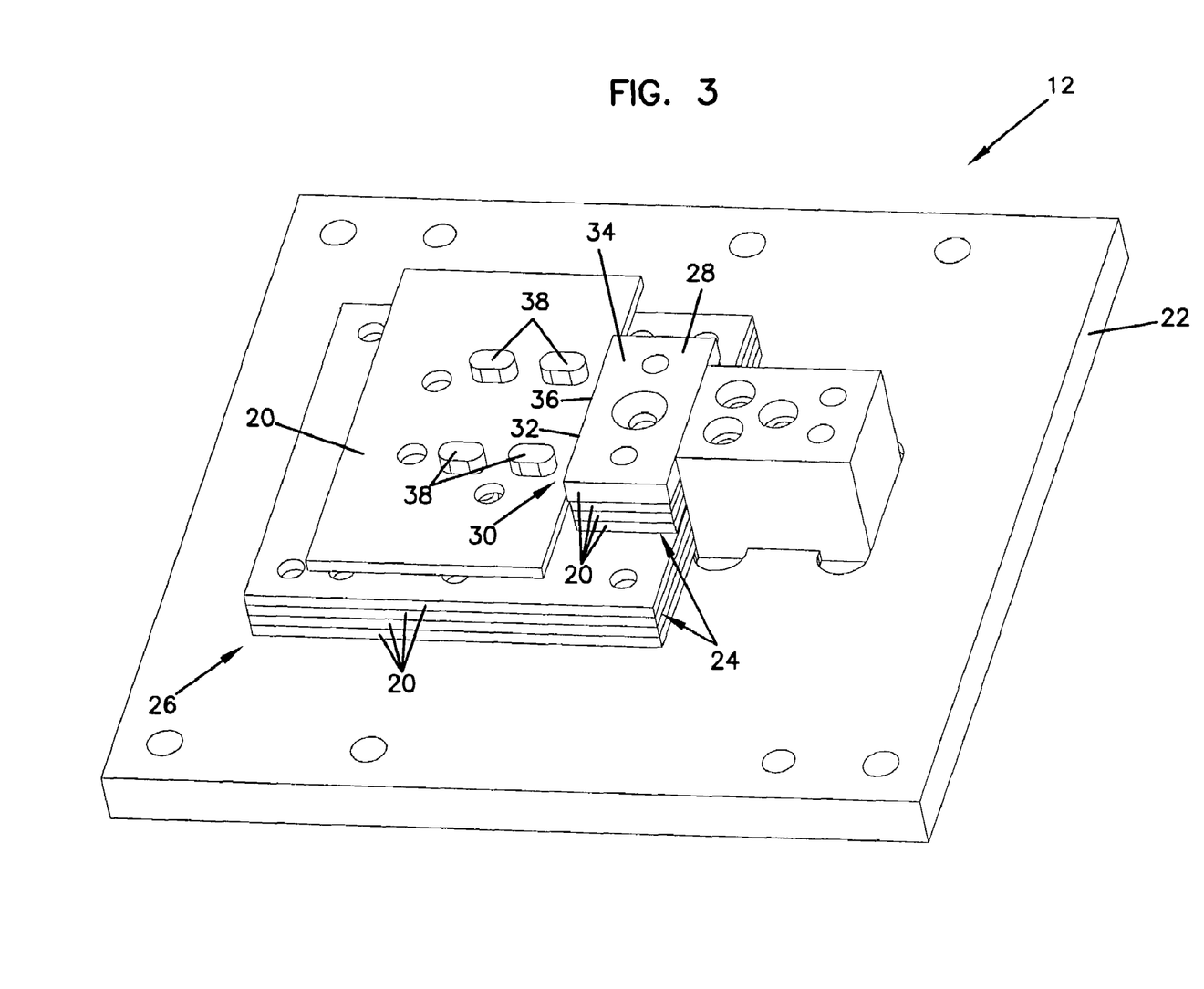
FIG. 3 is a perspective view of the punch assembly of FIG. 1.
Figure 4:
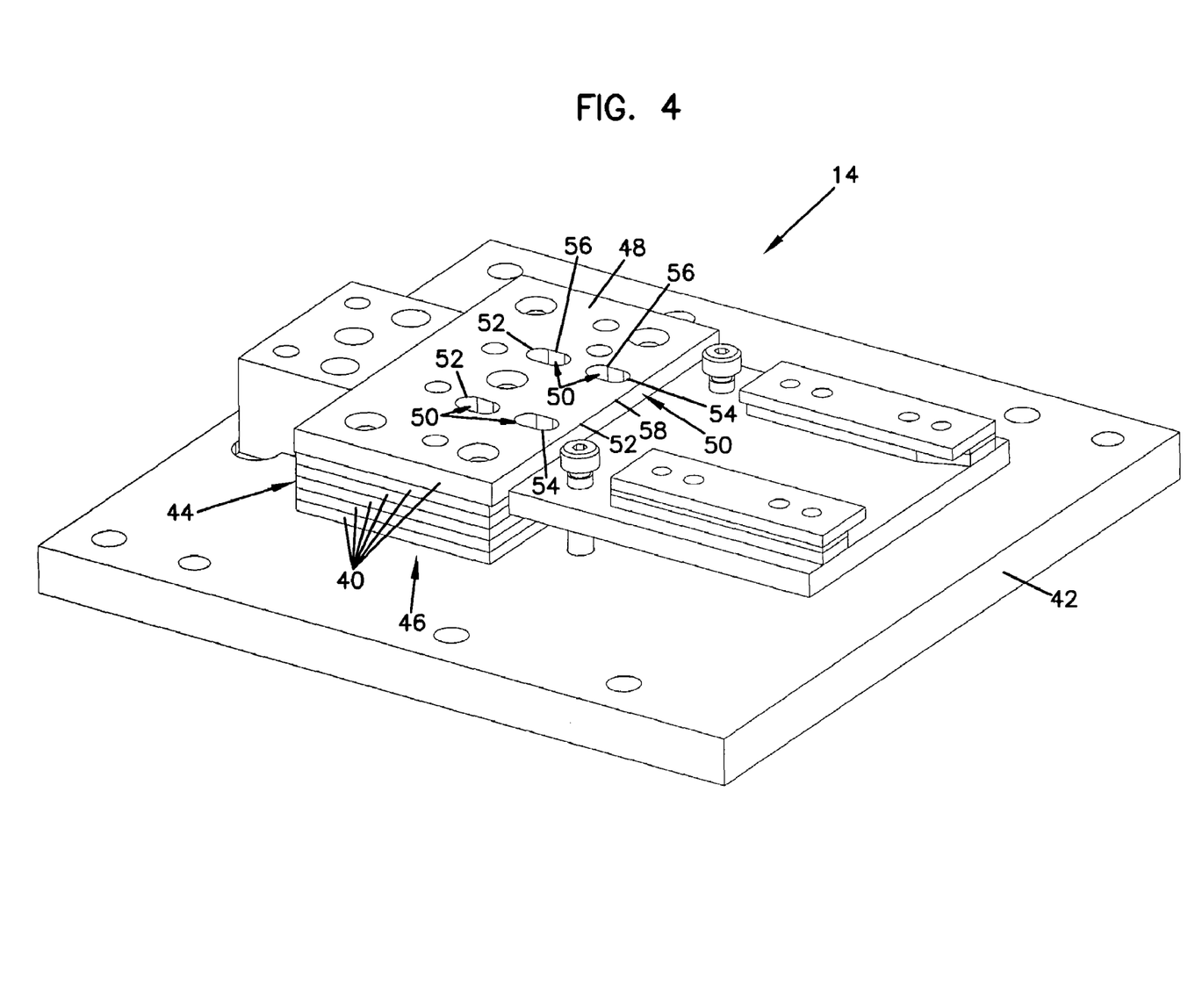
FIG. 4 is a perspective view of the die assembly of FIG. 1.

Referring now to FIGS. 3 and 4, the present laminated punch and die assemblies 12, 14, of the stamping tool 10 each include a plurality of laser cut plates 20, 40 (e.g., wafers, sheets, or planar components or sections). The plates 20, 40 are generally planar and made of metal to withstand the high impact and pressure of stamping operations. The plates 20 of the punch assembly 12 (FIG. 3) are stacked upon one another in predetermined order and/or alignment, and fastened to a punch retainer or base 22. The plates 40 of the die assembly 14 (FIG. 4) are stacked upon one another in predetermined order and/or alignment, and fastened to a die shoe or base 42. Threaded fasteners (not shown), for example, can be used to secure the stacked plates 20, 40 of the punch assembly 12 and the die assembly 14 to the respective bases 22, 42.

Referring to FIG. 3, the plurality of plates 20 of the punch assembly 12 includes plates 24 that define a body 26 of the punch assembly 12, and one or more part-forming plates 28 that define part-forming structure 30 of the punch assembly 12. Part-forming structure 30 is structure having at least one part-forming edge 32 that aids in shaping and forming the stamped part 18. The plates 24 that define the body 26 are made of metal, such as low carbon steel, for example, to withstand the high impact and pressure of stamping operations. The one or more plates 28 that define the part-forming structure 30 are typically made of high carbon steel for reasons as will be discussed in greater detail hereinafter.

The part-forming structure 30 of the illustrated punch assembly 12 includes cutting structure 34. The part-forming edge 32 of the part-forming structure 30 (i.e., of the cutting structure 34) includes a cutting edge 36 that cuts through the strip of material 16 during stamping operations. In the illustrated embodiment, the cutting edge 36 separates the part 18 from the strip of material 16. The present punch assembly 12 also includes slot punches 38 that form slots in the part 18.

Referring to FIG. 4, the plurality of plates 40 of the die assembly 14 includes plates 44 that define a body 46 of the die assembly 14, and one or more part-forming plates 48 that define part-forming structure 50 of the die assembly 14. Part-forming structure 50 is structure having at least one part-forming edge 52 that aids in shaping and forming the stamped part 18. Similar to the punch assembly, the plates 44 of the die assembly that define the body 46 can be made of low carbon steel, for example; while the one or more plates 48 that define the part-forming structure 50 are typically made of high carbon steel. The part-forming structure 50 of the illustrated die assembly 14 includes recesses 54. The part-forming edges 52 of the part-forming structure 50 include shearing edges 56 that define the recesses 46, which corresponding to the slot punches 38 (FIG. 3) of the punch assembly 12. The part-forming edges 52 of the illustrated die assembly 14 also include a shearing edge 58 that corresponds to the cutting edge 36 (FIG. 3) of the punch assembly 12.

Each of the plates 20, 40 of the punch and die assemblies 12, 14, generally have a thickness T (FIG. 5). The thickness T of the plates can depend in part upon whether the plate is constructed as a plate (e.g., 24, 44) that defines the body of the assembly, or constructed as a plate (e.g., 28, 48) that defines the part-forming structure. In general, the thickness of the plates T is typically no greater than about 0.625 inches; more preferably, the thickness T is about 0.250 to 0.375 inches. Advancements in laser cutting technology, however, can be a significant factor in permitting increased thicknesses of the plates.

One of the features of the presently disclosed method of laser cutting the plates 20, 40 of the laminated assemblies includes laser cutting the stamping shape of the part-forming structure 30, 50 of the assemblies 12, 14. Because the plates 20, 40 of the assemblies 12, 14 are laser cut, heat treating can be eliminated. That is, when the high carbon steel of the part-forming plates 28, 48 of the tool 10 undergoes the laser cutting process, the laser cut edges are hardened. Such hardening provides the structural strength needed to withstand the impact and pressure of stamping operations.

When fabricating the plates of the assemblies by laser cutting, only the edges (e.g., 36, 58 shown in FIG. 7) of the plates 28, 48 are hardened. The remaining portion of each of the plates is not hardened. This permits a user to further modify the tooling as needed for future stamping operations or manufacturing adjustments, even after the tooling 10 has been used. In conventional tools, once the tooling has been heat treated, the tooling is generally rendered non-modifiable, and any changes or modifications to the tooling must be done by re-manufacturing the particular assembly of the stamping tool from start.

Figures 6, 7:
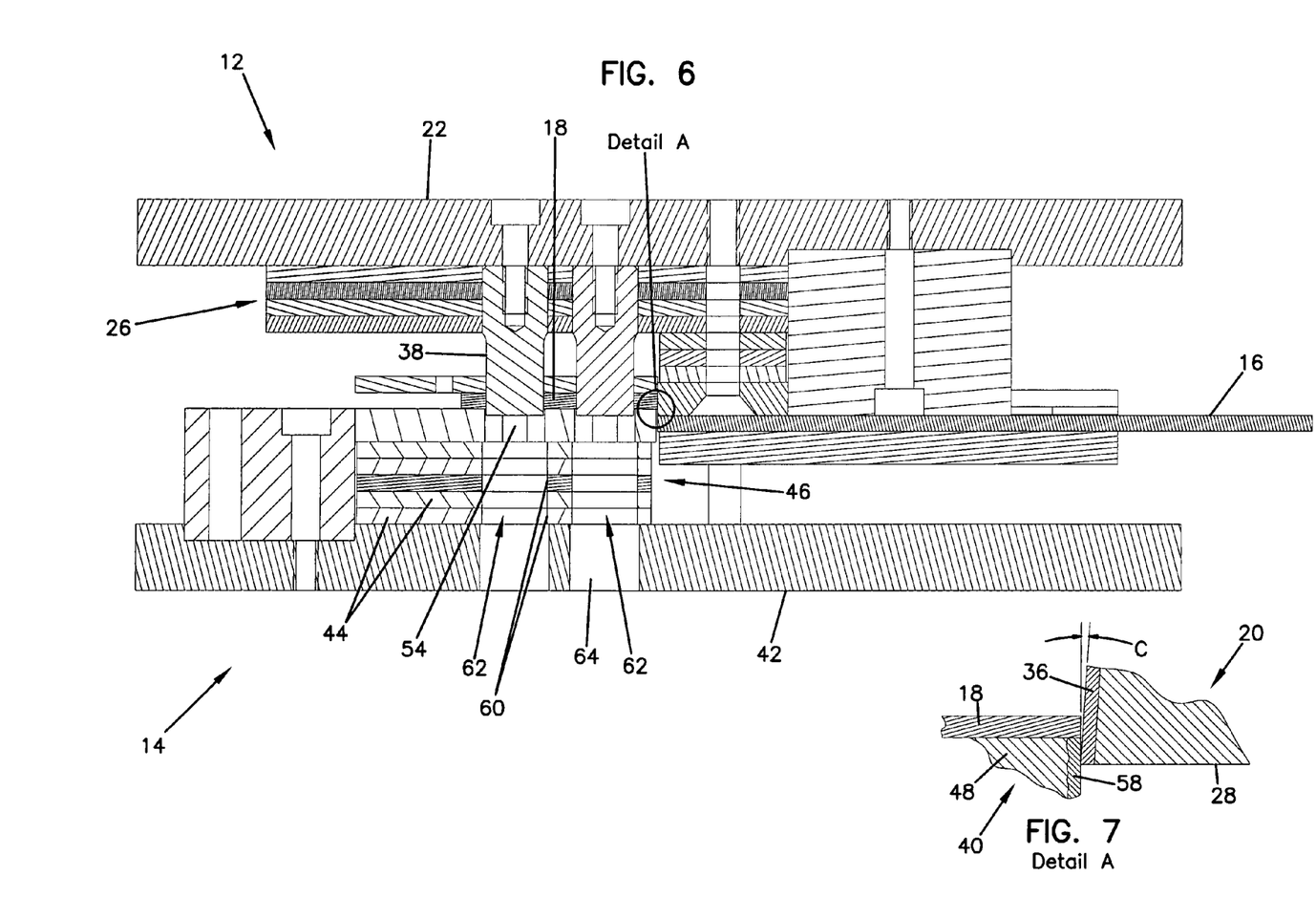
FIG. 6 is a cross-sectional view of the stamping tool of FIG. 1; shown in use during manufacture of a stamped component.
FIG. 7 is an enlarged view of Detail A of FIG. 6.

Referring now to FIG. 7, laser cutting each of the part-forming plates 28, 48 of the assemblies also provides a chamfered or angled edge (represented by angle C). That is, an angled edge (e.g. 36, 58) is formed via the laser cutting process without additional machining. Angled edges are typically machined into the tooling for stress relief of the cutting edges as the edges move past one another. In the present method, additional machining is not necessary to provide such stress relief.

Further, laser cutting the apertures (e.g., the slots or holes) in the plates creates a spike of material at a point where the laser cut starts and stops. The spike of material can act as slug-retention structure that retains slug material so that the slug material does not follow the tooling. For example, the spike of material retains the slot slug formed by the slot punches 38 of the punch assembly 12, as opposed to the slot slug following the slot punches 38 and subsequently becoming lodged in or obstructing normal operation of the punch assembly. In conventional methods, slug-retention structure is provided by additional machining processes during the manufacture of the tooling. The present method reduces/eliminates the need for such additional machining processes as slug-retention structure, i.e., spike material, is formed via the laser cutting process.

Another feature of the present punch and die assemblies of the disclosed stamping tool 10 relates to the ability to incorporate voids or spaces into the body 26, 46 of the assemblies 12, 14. Such voids or spaces can include, for example, cavities, channels, and passages, internal to the punch and die assemblies. As will be described in greater detail hereinafter, internal voids can be provided for communicating stamping fluids and gases used during stamping operations, directing the drop-out of stamping slugs, and for retaining or accommodating punch elements, such as punch plugs, for example.

The internal voids of the present stamping tool 10 can be provided without machining through the exterior surfaces of the bodies 26, 46 of the assemblies 12, 14. In particular, the internal voids can be defined by through-holes formed in a number of plates 20, 40 of the plurality of plates of the punch and die assemblies 12, 14. The through-holes are provided in predetermined locations and aligned to define the voids within the bodies of the assemblies.

For example, referring to FIG. 5, a number of plates 44 of the die assembly 14 include through-holes 60. The through-holes 60 can be formed by laser cutting the through-holes in the plates 44. The plates 44 are aligned when secured to the base 42 such that the through-holes 60 align to define internal passages or voids 62 (FIG. 6). The punch assembly 12 can includes similarly formed voids.

In the embodiment of FIG. 6, the internal passages 62 of the die assembly 14 direct stamping slugs, formed by the slot punches 38, through the body 46 of the die assembly. The stamping slugs then drop-out or pass through openings 64 formed in the die base 42. The slug drop-out passage 62 is formed by laser-cutting the through-holes 60 in each of the plates 44 that defines the die body 46, and aligning the holes 60 during assembly of the body. While each of the through-holes 60 has generally the same diameter, the holes can be made with incrementally increasing diameters so that the slug drop-out passage has a tapering or stepped construction.

Figure 8:
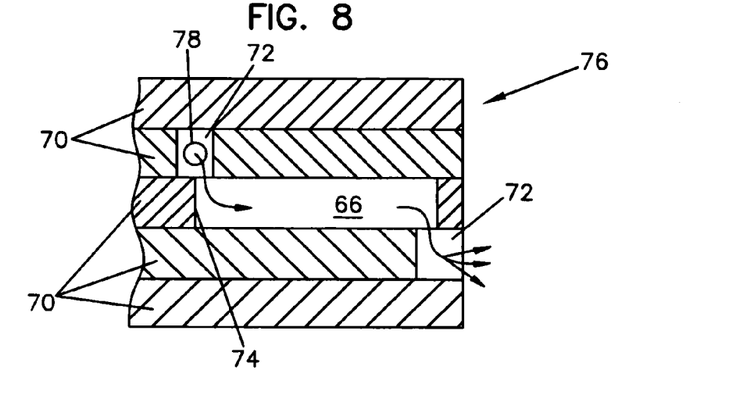
FIG. 8 is a partial cross-sectional view of an assembly of a stamping tool, illustrating an air passage, in accordance with the principles disclosed.

While the disclosed internal passage 62 of FIG. 6 is utilized for slug removal, other void configurations can be provided to accommodate other processes employed during stamping operations. For example, referring to FIG. 8, a schematic side view of a passage 66 that is used for air blow out is illustrated. The air passage 66 is formed in the body (e.g. 76) of the assembly (either a punch assembly or die assembly). The air passage 66 is defined by through-holes 72 and one or more slots 74 formed in a number of plates 70. An air passage entry and exit can be formed in any exterior surface of the body 76 by laser cutting. In some embodiments, the air entry is defined by a tapped hole (e.g. 78) machined into the side of the body to accommodate receipt of a threaded air nozzle.

As can be understood, the internal passage way can include complex flow patterns not practical in solid block tooling. Complex flow patterns can only be provided in solid block tooling by creating a number of cross-bores, for example, and subsequently plugging the exterior secondary openings of the cross-bores. This can weaken the structural integrity of the assembly, reducing the useful life of the stamping tool. The only exterior surface openings formed in the making of the air flow passages of the present assemblies are the entrance and the exit. And, with the exception of an optional threaded air entry, the internal air passage is provided without additional milling or drilling machine operations.

Figure 9:
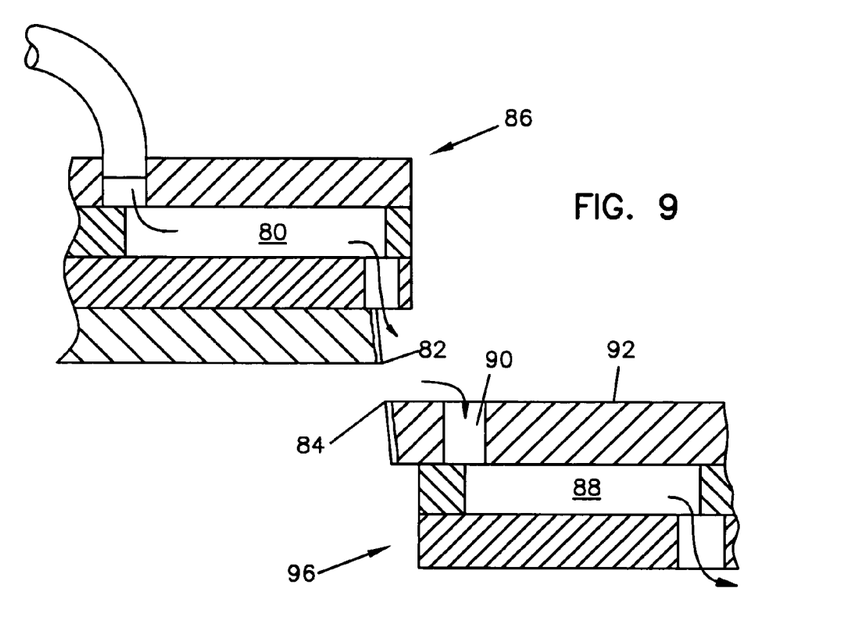
FIG. 9 is a partial cross-sectional view of assemblies of a stamping tool, illustrating lubrication passages, in accordance with the principles disclosed.

The internal voids or passages of the present punch and die assemblies can also be configured to communicate oil or other lubricating material directly to the part-forming edges of the stamping tool. Referring now to FIG. 9, a schematic side view of a lubrication passage 80 provided in a punch body 86 is illustrated. Oil flows through the passage 80 and exits the body 86 at a location adjacent to cutting edges 82, 84 of the stamping tool. As previously described with respect to the air passage 66 of FIG. 8, the lubrication passage 88 of the body 86 of the assembly is defined by through-holes and one or more slots formed in a number of plates.

Figure 10:
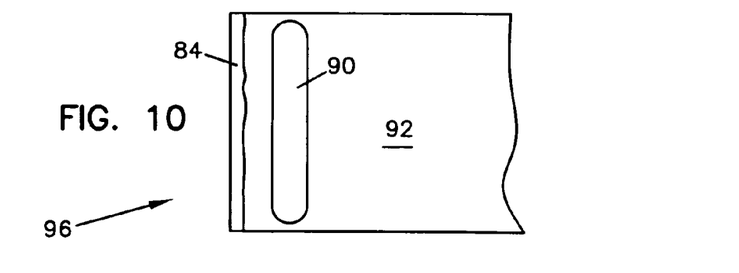
FIG. 10 is a partial top view of one of the assemblies of FIG. 9.

In FIG. 9, a die body 96 is similarly provided with a lubrication passage 88. As shown in FIGS. 9 and 10, the illustrated lubrication passage 88 includes a channel 90 formed in a top part-forming plate 92 of the assembly, adjacent to the cutting edge 84. Oil used to lubricate the edges 82, 84 of the stamping tool runs into the channel 90 and through the lubrication passages 88, where in turn, the oil can be collected for recycling. This significantly reduces waste associated with conventional oil misting methods by directing and applying oil only to areas where lubrication is needed, and by providing a way to efficiently and effectively collect excess oil.

Figure 11:
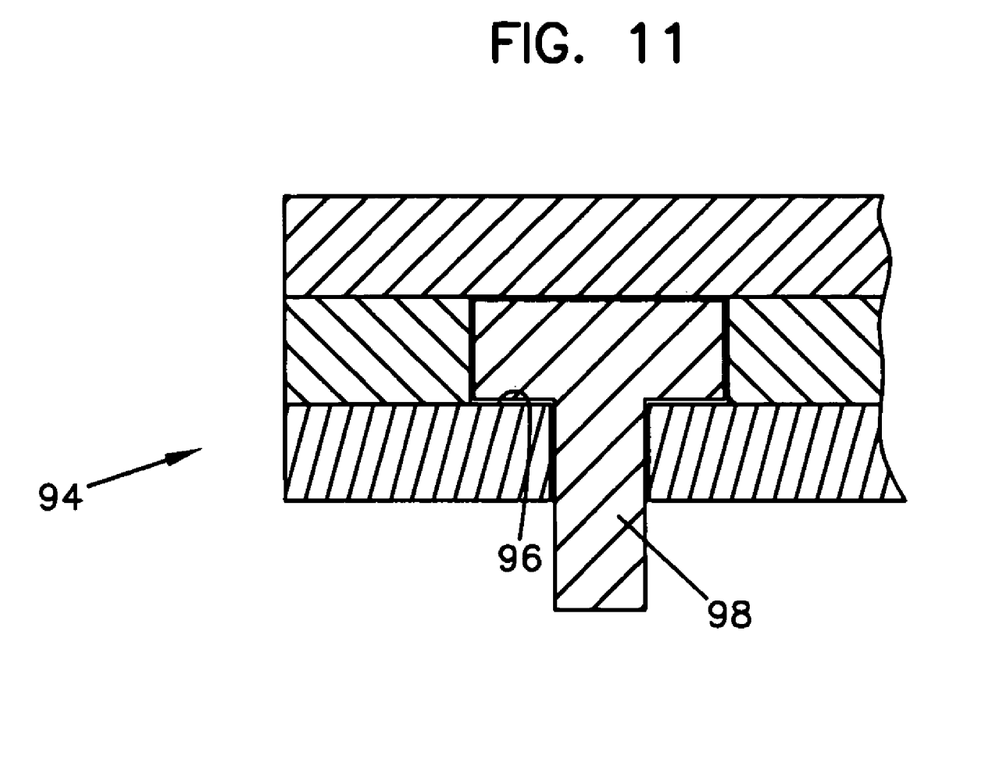
FIG. 11 is a partial cross-sectional view of an assembly of a stamping tool, illustrating tool retaining structure, in accordance with the principles disclosed.
Figure 12:
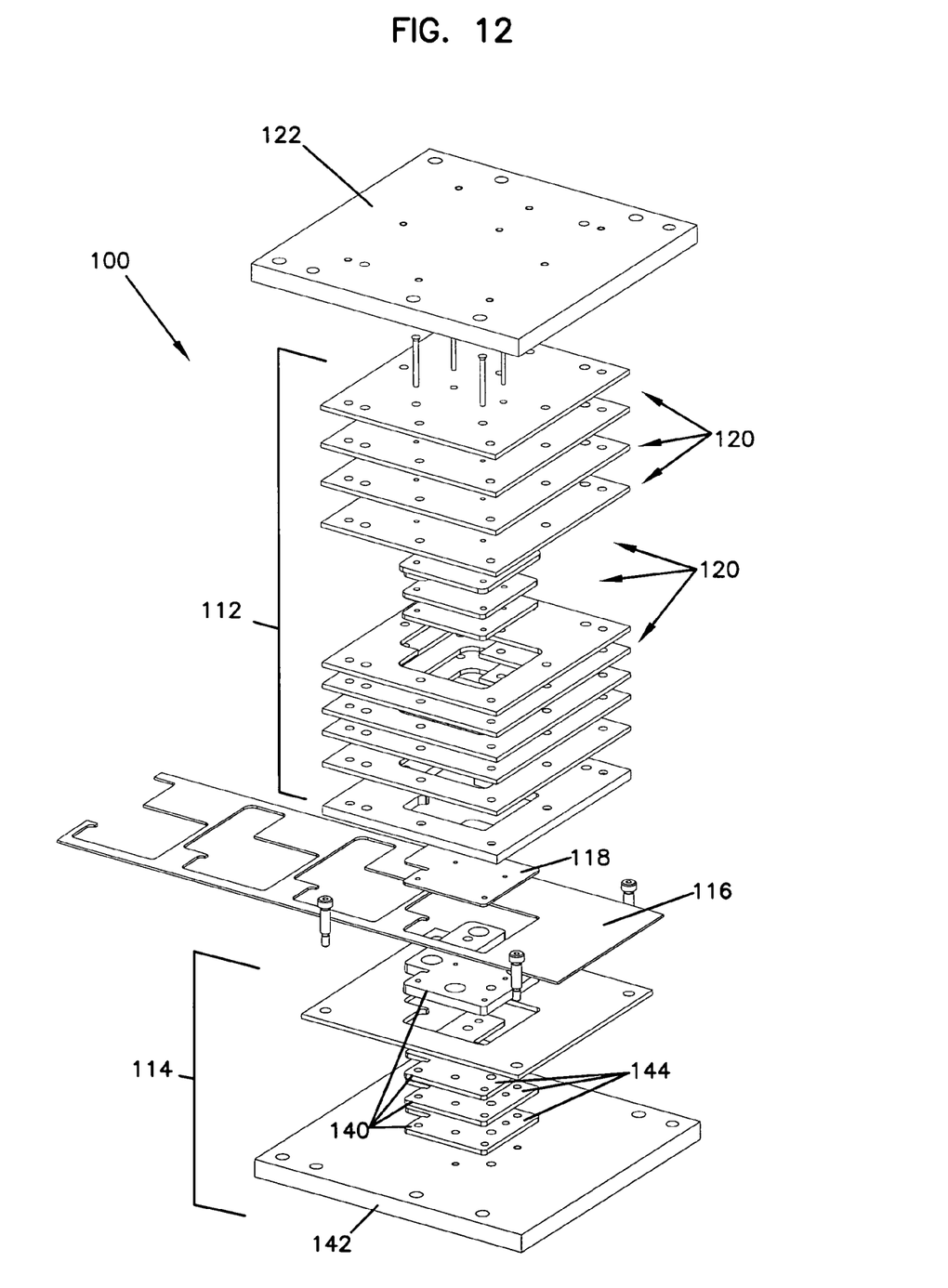
FIG. 12 is an exploded perspective view of another embodiment of a stamping tool, including a punch assembly and a die assembly, in accordance with the principles disclosed.

The internal voids of the assemblies can further be arranged and configured to retain tool elements. For example, as shown in FIG. 11, a body 94 can include plates having holes that form an internal counter bore 96 that functions to retain a punch piece 98. In the event the punch piece 98 breaks or requires replacement, the user need only disassemble the plates, install a new punch piece 98, and re-assemble the plates.

Figure 13:
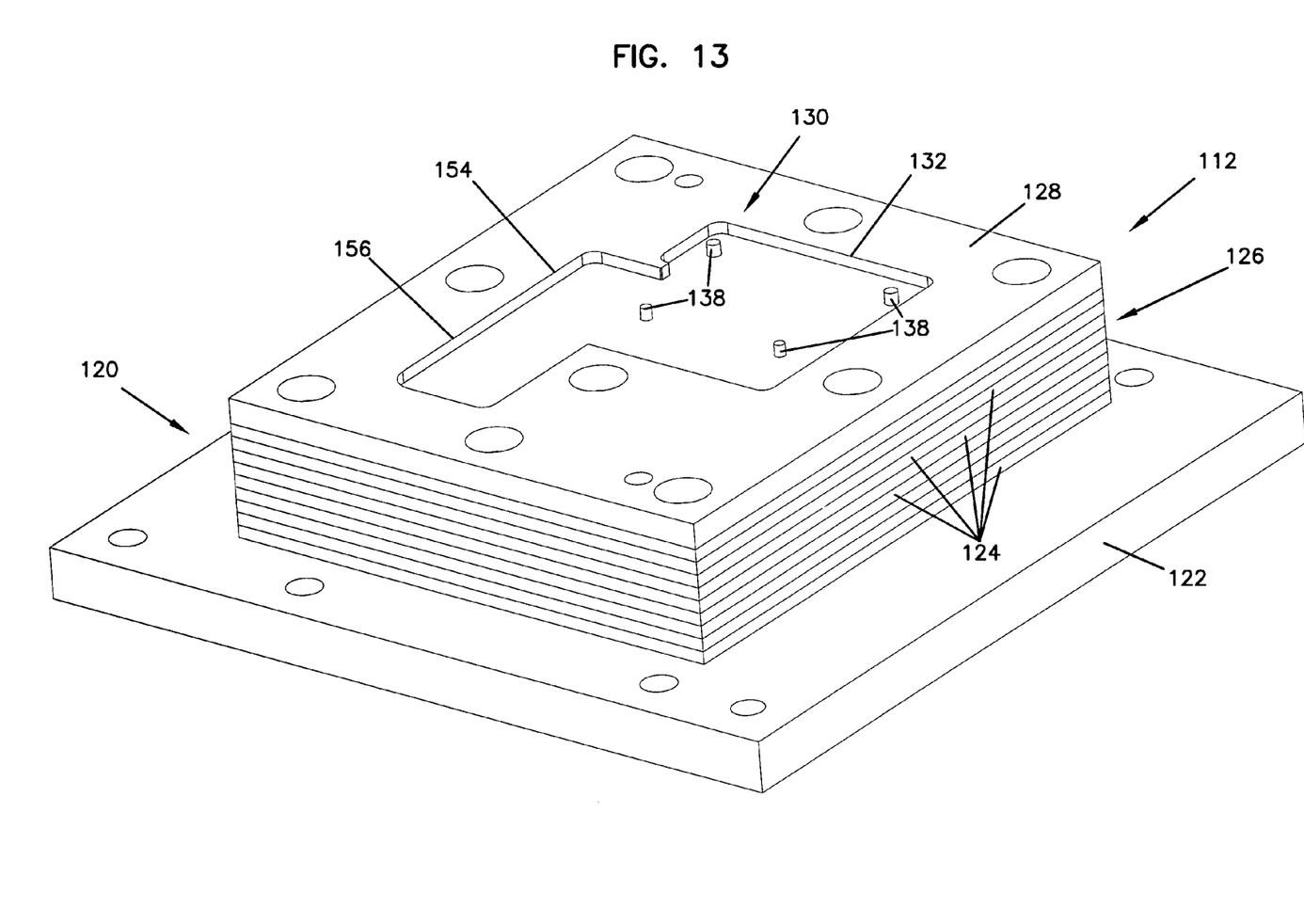
FIG. 13 is a perspective view the punch assembly of the stamping tool of FIG. 12.
Figure 14:
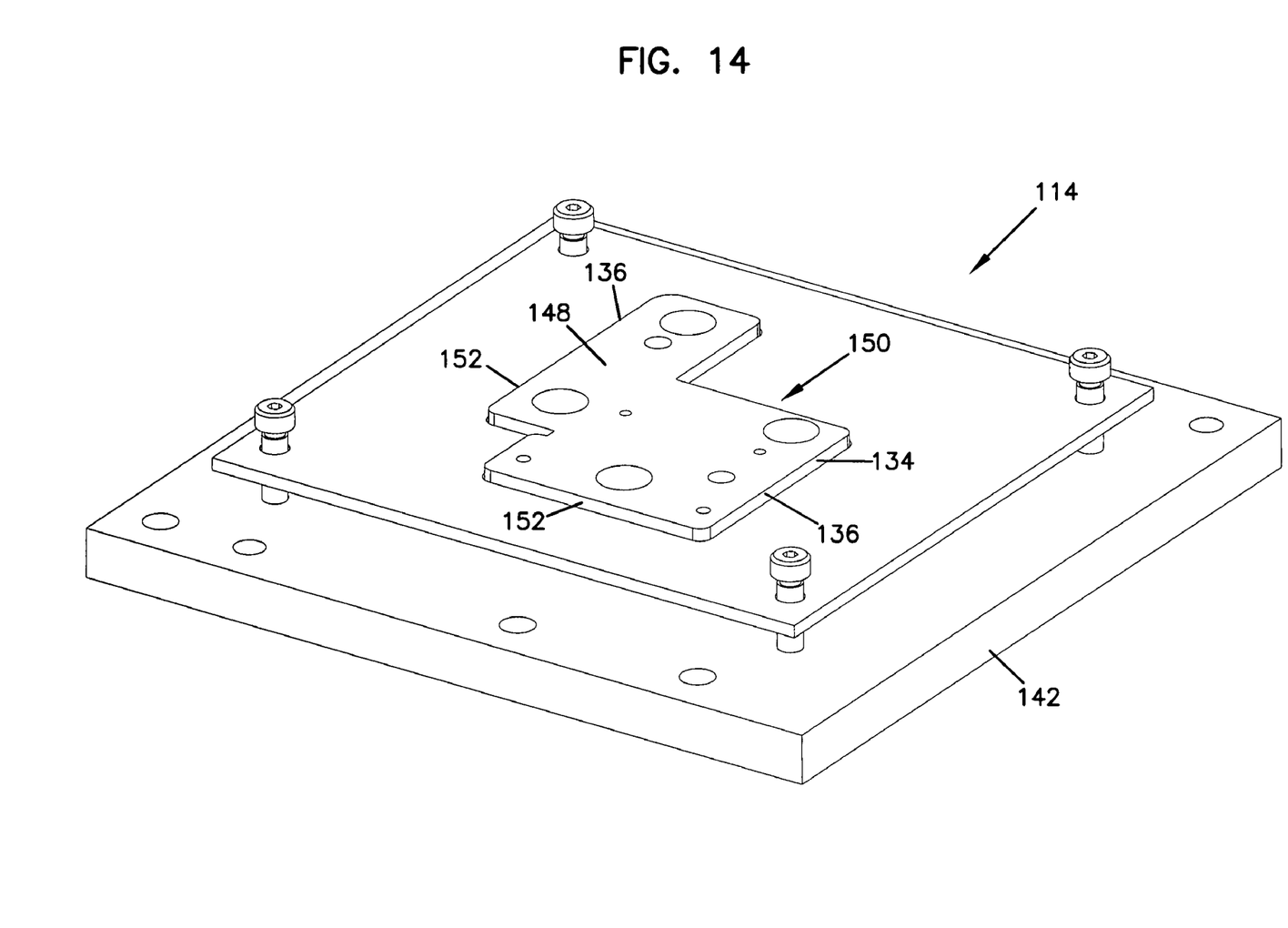
FIG. 14 is a perspective view of the die assembly of the stamping tool of FIG. 12.
Figure 15:
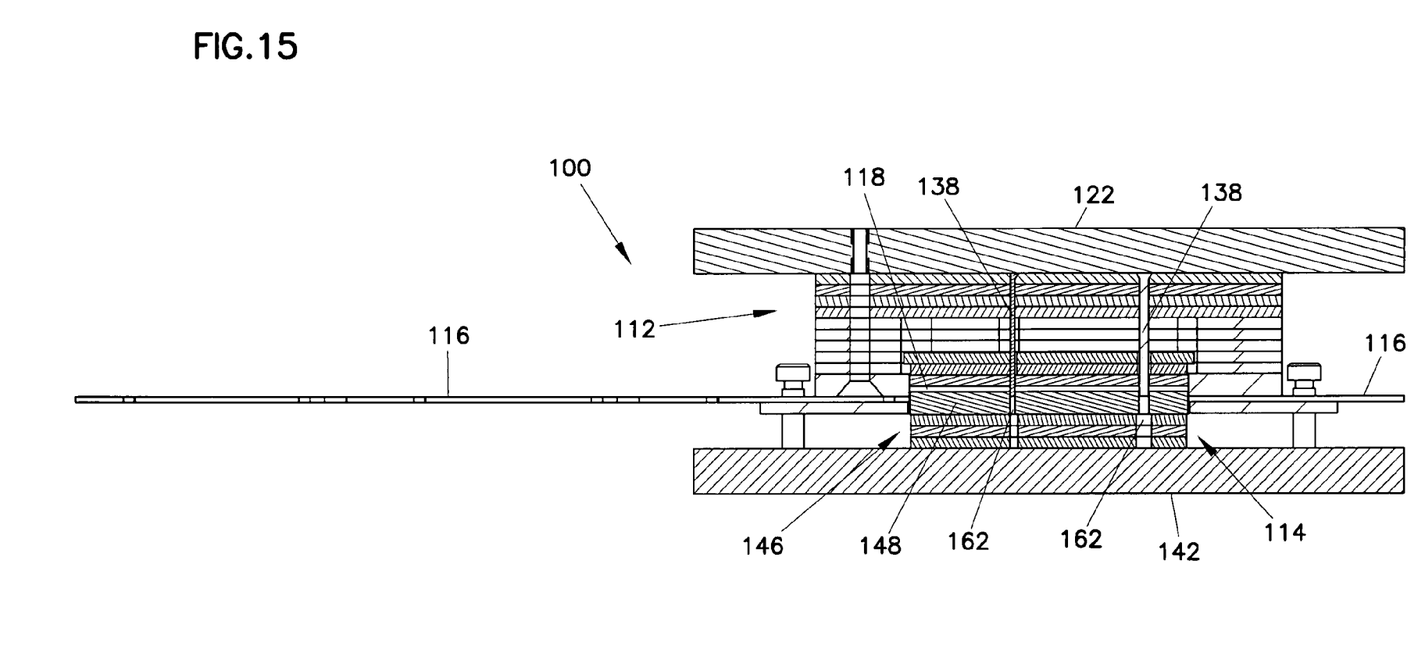
FIG. 15 is a cross-sectional view of the stamping tool of FIG. 12; shown in use during manufacture of a stamped component.

Referring now to FIGS. 12-15, another embodiment of a stamping tool 100, manufactured in accordance with the disclosed principles, is illustrated. The stamping tool 100 generally includes a first laminated punch assembly 112 (FIG. 13) and a second laminated die assembly 114 (FIG. 14). In operation, a strip of material 116 (FIG. 12) is positioned between the assemblies 112, 114. With great force, the punch assembly 112 and/or the die assembly 114 move toward one another, cutting or punching through the strip of material 116 to form a stamped part 118. The punch assembly 112 and/or the die assembly 114 then retract so that the strip of material 116 can be moved or progressed forward, and the cycle repeated for mass manufacture of the stamped part.

These alternative laminated punch and die assemblies 112, 114, illustrate the wide variety of stamping/cutting structure that can be incorporated into a stamping tool. As can be understood, a vast number of different cutting arrangements can be provided in accordance with the principles disclosed. Preferably, however, the assemblies 112, 114 of the stamping tool 100 are constructed from a plurality of laser cut plates 120, 140, as described with respect to the first embodiment.

That is, the laser cut plates 120, 140 are stacked upon one another in predetermined order and/or alignment, and fastened to a base 122, 142. Referring to FIG. 13, the plurality of plates 120 of the punch assembly 112 includes plates 124 that define a body 126 of the punch assembly 112, and one or more plates 128 that define part-forming structure 130 of the punch assembly 112. The part-forming structure 130 of the illustrated punch assembly 112 includes a recess 154. Part-forming edges 132 or shearing edges 156 of the part-forming structure 130 defines the recess 154. The present punch assembly 112 also includes pins 138 that form holes in the part 118.

Referring back to FIG. 12, the plurality of plates 140 of the die assembly 114 includes plates 144 that define a body 146 (FIG. 15) of the die assembly 114, and one or more plates 148 that define part-forming structure 150 of the die assembly 114. The part-forming structure 150 of the illustrated die assembly 114 includes cutting structure 134. Part-forming edges 152 of the part-forming structure 50 (i.e. of the cutting structure 134) include cutting edges 136 that corresponds to the shearing edges 156 (FIG. 13) of the punch assembly 112.

The plates 120, 140 of the present stamping tool 100 include hardened, angled edges that provide the features previously described. The plates 120, 140 also can include voids or spaces for communicating stamping fluids and gases used during stamping operations, directing the drop-out of stamping slugs, and for retaining or accommodating punch elements. For example, referring to FIG. 15, the illustrated die assembly 114 includes internal passages 162 that direct stamping slugs, formed by the pins 138, through the body 146 of the die assembly. In this embodiment, the internal passages 162 have a stepped construction that aids in directing stamping slug drop-out. As previously described, other void configurations can be provided to accommodate other processes employed during stamping operations.

The disclosed method of manufacturing tooling greatly simplifies current stamping technology. By eliminating the large solid blocks used in conventional tooling and providing stacked laser-cut wafers or plates, the need for expensive and time-consuming machining is avoided. The present method further makes use of a hardening process that high carbon steel undergoes during the laser cutting process; reducing/eliminating the need for heat treating and subsequent grinding operations. Additional advantages to the disclosed method include the ability to incorporate cavities and passages internal to the punch and die assemblies, the ability to modify the punch and die assemblies because only the edges of the punch and die bodies are hardened, and the reduction/elimination of machining relief angles and/or slug-retention structure in cutting edges of the tooling. Due to the presently disclosed method, stamping tools can be made at low cost and in a significantly reduced period of time.

The above specification provides a complete description of the present invention. Since many embodiments of the invention can be made without departing from the spirit and scope of the invention, certain aspects of the invention reside in the claims hereinafter appended.

What is claimed is:

1. A method of making a stamping tool, comprising the steps of:
   a) providing a plurality of planar steel sections, the plurality including at least one low carbon steel section selected to withstand repeated stamping operation impact and at least one high carbon steel section, the step of providing the plurality of planar steel sections including:
      i) laser cutting the plurality of planar steel sections; and
      ii) hardening a part-forming edge of the at least one high carbon steel section without heat treating the part-forming edge, the part-forming edge being constructed to separate a stamped shape from material stock during use of the stamping tool;
   b) aligning the planar steel sections to form a tool body, wherein a laser-cut edge of one of the planar steel sections defines the part-forming edge; and
   c) securing the aligned planar steel sections relative to one another to define one of a punch body and a die body.

2. The method of claim 1, further including laser cutting through-holes in a number of the planar steel sections and aligning the planar steel sections such that internal voids, defined by the through-holes, are provided within the tool body.

3. The method of claim 2, wherein the step of aligning the planar steel sections includes aligning the sections such that internal passages are formed within the tool body.

4. The method of claim 2, further including providing internal passages without machining through an exterior surface of the tool body.

5. The method of claim 1, wherein the step of securing the aligned planar steel sections includes securing the aligned planar steel section to a base.

6. The method of claim 1, wherein only the laser-cut edge that defines the part-forming edge of the at least one high carbon steel section is hardened to allow for modification of the remaining non-hardened portion of the at least one high carbon steel section.

7. The method of claim 1, wherein the tool body has hardened edges, the remainder of the tool body being non-hardened.

8. The method of claim 1, wherein the step of laser cutting the plurality of planar steel sections includes providing sections having angled edges.

9. The method of claim 1, wherein the tool body defines a punch body of the stamping tool, the part-forming edge defining a cutting edge of cutting structure that separates the stamped shape from the material stock.

10. The method of claim 1, wherein the tool body defines a die body of the stamping tool, the part-forming edge defining a shearing edge of a recess that separates the stamped shape from the material stock.

11. A stamping tool, comprising:
    a) a punch assembly, including:
       i) a punch base; and
       ii) a plurality of plates that define a punch body, the punch body being secured to the punch base, the plurality of plates of the punch body including at least one low carbon steel plate and at least one high carbon steel plate, the at least one high carbon steel plate having a hardened part-forming edge constructed to separate a stamped shape from material stock during stamping use of the stamping tool, the punch body further defining an internal void;
       iii) wherein each of a number of plates of the plurality of plates of the punch body defines a through-hole, each of the through-holes of the number of plates partially defining the internal void of the punch body; and
    b) a die assembly, including:
       i) a die base; and
       ii) a plurality of plates that define a die body, the die body being secured to the die base, the plurality of plates of the die body including at least one low carbon steel plate and at least one high carbon steel plate, the at least one high carbon steel plate having a hardened shearing edge defining a recess corresponding to the stamped shape, the die body further defining an internal void;
       iii) wherein each of a number of plates of the plurality of plates of the die body defines a through-hole, each of the through-holes of the number of plates partially defining the internal void of the die body.

12. The stamping tool of claim 11, wherein the pluralities of plates of the punch body and the die body have laser-cut edges.

13. The stamping tool of claim 12, wherein the hardened edges of each of the punch assembly and the die assembly includes an angled edge produced by laser-cutting the edges.

14. The stamping tool of claim 11, wherein only the part-forming edge and the shearing edge of the punch and die bodies are hardened the remainder of each of the punch and die bodies being non-hardened.

15. The stamping tool of claim 11, wherein each of the plates of the pluralities of plates has a thickness, the thickness being no greater than about 0.625 inches.

16. The stamping tool of claim 11, wherein at least one of the internal voids of the punch assembly and the die assembly defines a lubrication passage.

17. The stamping tool of claim 11, wherein at least one of the internal voids of the punch assembly and the die assembly defines an air blow-out passage.

18. A stamping tool, comprising:
    a) a punch assembly and a die assembly, at least one of the punch and die assemblies including a plurality of laser-cut plates, the plurality of laser-cut plates being aligned to define a tool body, the plurality of laser-cut plates including at least one low carbon steel plate and a least one high carbon steel plate, the at least one high carbon steel plate of the tool body including a part-forming edge hardened by the laser-cutting process, the hardened part-forming edge being constructed to separate a stamped shape from material stock during stamping use of the stamping tool.

19. The stamping tool of claim 18, wherein a number of plates of the plurality of plates include a through-hole, the through-holes defining an internal passage of the tool body.

* * * * *